(12) United States Patent
Kemper et al.

(10) Patent No.: US 6,409,880 B2
(45) Date of Patent: Jun. 25, 2002

(54) APPARATUS AND PROCESS FOR REMOVING FINE IMPURITIES FROM A FIBROUS SUSPENSION

(75) Inventors: Martin Kemper, Weingarten; Horst Wiese, Schongau, both of (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/883,380

(22) Filed: Jun. 19, 2001

Related U.S. Application Data

(63) Continuation of application No. 09/236,235, filed on Jan. 22, 1999, now Pat. No. 6,277,239.

(30) Foreign Application Priority Data

Jan. 23, 1998 (DE) .......................................... 198 02 494
Feb. 18, 1998 (DE) .......................................... 198 06 732

(51) Int. Cl.⁷ ............................. D21H 11/14; D21B 1/08
(52) U.S. Cl. ............................. 162/4; 162/55; 209/728; 210/221.2; 210/260; 210/928
(58) Field of Search ................... 162/4, 55; 210/221.2, 210/260, 928; 209/12.1, 170, 728, 928

(56) References Cited

U.S. PATENT DOCUMENTS

| | | | |
|---|---|---|---|
| 4,780,179 A | 10/1988 | Clement | 162/5 |
| 5,417,806 A | 5/1995 | Matzke et al. | 162/4 |
| 5,580,446 A | 12/1996 | Markham | 162/4 |
| 5,707,488 A | 1/1998 | Markham | 162/4 |
| 5,762,756 A | 6/1998 | Scott et al. | 162/4 |

FOREIGN PATENT DOCUMENTS

| | | |
|---|---|---|
| DE | 2946160 | 5/1980 |
| DE | 3148749 | 9/1984 |
| DE | 3610939 | 6/1987 |
| DE | 4192568 | 10/1992 |
| WO | 9616222 | 5/1996 |

OTHER PUBLICATIONS

Rienecker, "Sortierung von Altpapierstoff zur Herstellung von graphischen Papieren," *Wochenblatt für Papierfabrikation*, No. 23, pp. 1149–1159 (1997).

Ortner et al., "Verfahrenstechnische Lösungen zur Abtrennung klebender Verunreinigungen," No. 24/25, pp. 702–710 (1983).

Siewert, "Systembausteine der Altpapieraufbereitung," *Wochenblatt für Papierfabrikation*, No. 16, pp. 681–687 (1995).

"Stickies—Sortierung, Dispergierung und Mikroflotation," *Papiererzeungung*, No. 29/97, pp. 705 and 706.

Maisch, "Besuch bei der Perlen Papier AG anlässlich der Sulzer Escher Wyss–Kundentagung," *Wochenblatt für Papierfabrikation*, No. 17, pp. 687, 688, 690, 692, and 694 and Figures 3 and 4 with descriptions (1993).

(List continued on next page.)

*Primary Examiner*—Dean T. Nguyen
(74) *Attorney, Agent, or Firm*—Greenblum & Bernstein, P.L.C.

(57) ABSTRACT

Process and apparatus for removing fine impurities from a fibrous suspension. The process and apparatus each provide for conveying the fibrous suspension to at least one sorting device, separating the fibrous suspension using the at least one sorting device into an accepts portion and a rejects portion, finishing at least some of the accepts portion leaving the at least one sorting device using a finishing device, separating at least some portion of the rejects portion leaving the at least one sorting device using at least one last sorting device into an accepts portion and an rejects portion, separating at least some portion of the accepts portion leaving the at least one last sorting device into an accepts portion and a rejects portion using a flotation device, and finishing at least some portion of the accepts portion leaving the flotation device using the finishing device.

58 Claims, 4 Drawing Sheets

OTHER PUBLICATIONS

Ortner, "Deinkingstoff—Faserstoffkomponente für hochwertige Druckpapiere," *Wochenblatt für Papierfabrikation,* No. 1, pp. 7–15.

Pfalzer, "Verfahrenstechnische Weiterentwicklung des Deinking–Prozesses," *Wochenblatt für Papierfabrikation,* No. 11/12, pp. 443–448.

Schwarz, "Stickies—eine Herausforderung für die gesamte Prozesstechnologie," *Wochenblatt für Papierfabrikation,* No. 14/15, pp. 692–698.

Selder, "Ergebnisse mit einer Anlage zur Aufbereitung von gemischten Büro—und Druckereiabfällen," No. 22/1993, pp. 574–578 and 580.

Pfalzer, "Stofftechnologie—Sortierung," *Wochenblatt für Papierfabrikation,* No. 23/24, pp. 1148–1159 (1997).

Patent Abstracts of Japan of SP 5–209383 A, C–1136, vol. 17, No. 655 (Dec. 6, 1993).

APPARATUS AND PROCESS FOR REMOVING FINE IMPURITIES FROM A FIBROUS SUSPENSION

CROSS-REFERENCE TO RELATED APPLICATIONS

The present application is a continuation of U.S. application Ser No. 09/236,235, filed Jan. 22, 1999, now U.S. Pat. No. 6,277,239 the disclosure of which is expressly incorporated by reference herein in its entirety. The present application also claims priority under 35 U.S.C. §119 of German Patent Application No. 198 02 494.0, filed on Jan. 23, 1998, and German Patent Application No. 198 06 732.1, filed on Feb. 18, 1998, the disclosures of which are expressly incorporated by reference herein in their entirety.

BACKGROUND OF THE INVENTION

1. Field of the Invention

The invention relates to an apparatus and process for removing impurities, and more particularly, to an apparatus and process for removing fine impurities from a fibrous suspension.

2. Discussion of Background Information

Fibrous suspensions, particularly those obtained from recycled paper which are intended for paper production, contain undesirable attendant materials, also referred to as "interfering materials," which must be removed in the preparation system. The removal of these interfering materials is generally performed in various steps since a fibrous suspension purification in a single process step is rarely successful.

Wet straining processes have turned out to be particularly effective for the removal of fine impurities. In such processes, the suspension is conveyed into a straining device and is divided into at least two portions, an "accepts" portion, i.e., the materials that have passed the wire, and a "rejects" portion, i.e., the materials rejected due to their size. Generally, in the parlance of paper makers, such wet straining processes are known as "sorting." It is also known to subject the rejected materials, i.e., the rejects portion, to one or more additional subsequent straining steps. This process is known as "multistep sorting." Multistep sorting can be carried out at various points of the paper stock preparation. Generally, the later the sorting occurs during the process, the finer the wire openings that can be used in the process. Examples of multistep wet straining are demonstrated in the scientific paper "Sortierung von Altpapierstoff zur Herstellung von graphischen Papieren" [Sorting of Recycled Paper Stock for the Manufacturing of Graphic Papers] by R. Rienecker from the Wochenblatt für Papierfabrikation [Weekly for Paper Making] No. 23/24, 1997, pp. 1149 to 1159.

Although a large number of different systems are already known and used for purifying paper stock suspensions, these systems are often unsuccessful in removing all interfering impurities from the suspension. In particular, very fine, adhesive impurities, which often cause great difficulties in the production of paper, even in small quantities, can only be removed at great expense, if at all.

SUMMARY OF THE INVENTION

The present invention provides an apparatus and process for removing fine impurities from a fibrous suspension. The apparatus comprises a dissolution device, a pre-purification device, a wet straining device, and a flotation device. The wet straining device comprises at least two sorting devices installed in sequence, each sorting device having a wire for separating the fibrous suspension into an "accepts" portion and a "rejects" portion. The flotation device is adapted to purify the "accepts" portion of at least one sorting device, and further separates the fibrous suspension into an "accepts" portion and a "rejects" portion.

The flotation device may be further adapted to purify the "accepts" portion of the last of the at least two sorting devices. Additionally, the flotation device may be adapted to receive the "accepts" portions of the last two of the at least two sorting devices.

The apparatus may also comprise a finishing device adapted to receive at least one "accepts" portion of the wet straining device. Furthermore, the apparatus may be adapted to receive at least one "accepts" portion of the flotation device.

The pre-purification device may be adapted to remove ink particles, and may remove these ink particles by flotation Additionally, the sorting devices of the wet straining device may be embodied as closed pressure sorters. The pressure sorters may each be equipped with wires having free wire openings, the free wire openings having slits with a width of between about 0.08 and 0.5 mm. Alternatively, the free wire openings may be holes with a diameter of between about 0.8 and 3 mm.

The flotation device may additionally comprise a selectively functioning flotation cell.

The process for removing fine impurities from a fibrous suspension comprises the steps of subjecting the fibrous suspension to a dissolution process, subjecting the fibrous suspension to a pre-purification process, and purifying the fibrous suspension in a wet straining process. At the wet straining process, at least two sorting devices are installed in sequence, each sorting device having a wire for separating the fibrous suspension into an "accepts" portion and a "rejects" portion. The wet straining process comprises introducing a "rejects" portion rejected at the wire of a preceding sorting device into the subsequent sorting device until a last subsequent sorting device has been reached, conveying the "rejects" portion out of the process, and conveying the "accepts" portion to a flotation process. The "accepts" portion is purified by at least one flotation process, which further separates the fibrous suspension into an "accepts" portion and a "rejects" portion, the "rejects" portion containing a majority of the impurities of the fibrous suspension, and the "accepts" portion containing a majority of the fibers of the fibrous suspension.

The "accepts" portions of the sorting devices may contain the highest percentage of interfering materials that can be floated and may be purified in the flotation process.

Additionally, the "accepts" portion of the last subsequent sorting device may be purified in the flotation process. Alternatively, the "accepts" portions of the last two steps of the wet straining process may be supplied to the flotation step process.

The "accepts" portions of the wet straining process that are not purified in the flotation process may also be combined and supplied directly to a finishing process. Also, the "accepts" portion of the flotation process may be supplied to the remaining "accepts" portions of the wet straining process.

The pre-purification process may remove ink particles, and may remove these ink particles by flotation.

The sorting devices of the wet straining process may be closed pressure sorters. These pressure sorters may be equipped with wires having free wire openings having slits with a width of between about 0.08 and 0.5 mm. Alternatively, the free wire openings may be holes with a diameter of between about 0.8 and 3 mm.

At the beginning of the wet straining process, the dry matter content of the fibrous suspension may be set to a value of between about 0.6 and 2.5%, or alternatively, may be set to a value of between about 2 and 4%.

The flotation step may be performed in a selectively functioning flotation cell.

The suspension to be purified may further contain adhesive particles.

Before the flotation step, the suspension may be subjected to a chemical treatment in which surface activity of the interfering materials is increased.

The fibrous suspension may be dispersed before the flotation process or alternatively, before the wet straining process. A specific work of at least 20 kWh/to may be transmitted to the fibrous suspension during the dispersion of the fibrous suspension.

The invention also provides for a process for removing fine impurities from a fibrous suspension, comprising conveying the fibrous suspension to at least one sorting device, separating the fibrous suspension using the at least one sorting device into an accepts portion and a rejects portion, finishing at least some of the accepts portion leaving the at least one sorting device using a finishing device, separating at least some portion of the rejects portion leaving the at least one sorting device using at least one last sorting device into an accepts portion and an rejects portion, separating at least some portion of the accepts portion leaving the at least one last sorting device into an accepts portion and a rejects portion using a flotation device, and finishing at least some portion of the accepts portion leaving the flotation device using the finishing device.

At least one intermediate sorting device may be arranged between the at least one sorting device and the at least one last sorting device, and the process may further comprise separating at least some of the rejects portion leaving the at least one sorting device using the at least one intermediate sorting device into an accepts portion and a rejects portion, and finishing at least some of the accepts portion leaving the at least one intermediate sorting device using the finishing device. The process may further comprise conveying at least some of the rejects portion leaving the at least one intermediate sorting device to the at least one last sorting device.

At least one intermediate sorting device may be arranged between the at least one sorting device and the at least one last sorting device and an additional flotation device, and the process may further comprise separating at least some of the rejects portion leaving the at least one sorting device using the at least one intermediate sorting device into an accepts portion and a rejects portion, separating at least some of the accepts portion leaving the at least one intermediate sorting device using the additional flotation device into an accepts portion and a rejects portion, and finishing at least some of the accepts portion leaving the additional flotation device using the finishing device. The process may further comprise conveying at least some of the rejects portion leaving the at least one intermediate sorting device to the at least one last sorting device.

At least a first and a second intermediate sorting device may be arranged between the at least one sorting device and the at least one last sorting device, and the process may further comprise separating at least some of the rejects portion leaving the at least one sorting device using the first intermediate sorting device into an accepts portion and a rejects portion, separating at least some of the accepts portion leaving the first intermediate sorting device using the second intermediate sorting device into an accepts portion and a rejects portion, and finishing at least some of the accepts portion leaving the second intermediate sorting device using the finishing device. The process may further comprise conveying at least some of the rejects portion leaving each of the first and second intermediate sorting devices to the at least one last sorting device.

An additional sorting device may be arranged after the at least one last sorting device, and the process may further comprise separating at least some of the rejects portion leaving the at least one last sorting device using the at least one additional sorting device into an accepts portion and a rejects portion, and conveying at least some of the accepts portion leaving the additional sorting device to the at least one last sorting device.

A first and a second intermediate sorting device may be arranged between the at least one sorting device and the at least one last sorting device and further comprising an additional sorting device arranged after the at least one last sorting device, and the process may further comprise separating at least some of the rejects portion leaving the at least one sorting device using the first intermediate sorting device into an accepts portion and a rejects portion, separating at least some of the accepts portion leaving the first intermediate sorting device using the second intermediate sorting device into an accepts portion and a rejects portion, separating at least some of the rejects portion leaving the at least one last sorting device using the additional sorting device into an accepts portion and a rejects portion, and finishing at least some of the accepts portion leaving the second intermediate sorting device using the finishing device. The process may further comprise conveying at least some of the accepts portion leaving the additional sorting device to the flotation device. The process may further comprise conveying at least some of the rejects portion leaving each of the first and second intermediate sorting devices to the at least one last sorting device.

Before the conveying of the fibrous suspension to at least one sorting device, the process may comprise subjecting the fibrous suspension to at least one of dissolution and pre-purification. Before the conveying of the fibrous suspension to at least one sorting device, the process may comprise subjecting the fibrous suspension to each of dissolution and pre-purification.

The process may further comprise removing ink particles during pre-purification. The ink particles may be removed by flotation during pre-purification. The flotation device may perform a flotation separation without chemicals. The flotation device may perform a flotation separation without chemicals used to remove inks. The flotation device may perform a flotation separation without flotation chemicals. At least one of the at least one sorting device and the at least one last sorting device may comprise a pressure sorter. The pressure sorter may be equipped with at least one wire. The at least one wire may have openings. The openings may comprise slits having a width of between about 0.08 and 0.5 mm. The openings may comprise holes having a diameter of between about 0.8 and 3 mm. A dry matter content of the fibrous suspension before entering the at least one sorting device may be between about 0.6 and 2.5%. A dry matter content of the fibrous suspension before entering the at least one sorting device may be between about 2 and 4%. The flotation device may comprise a selectively functioning flotation cell. The fibrous material suspension may comprise adhesive particles.

The process may further comprise chemically treating the fibrous material suspension in order to increase a surface activity of interfering materials, the chemical treatment occurring prior to the flotation device. Before the conveying of the fibrous suspension to at least one sorting device, the process may comprise subjecting the fibrous suspension to dispersion, and further comprising transmitting a specific work of at least 20 kWh/to to the fibrous suspension during the dispersion.

The invention further provides for an apparatus for removing fine impurities from a fibrous suspension, comprising at least one sorting device arranged to receive the fibrous suspension, the least one sorting device separates the fibrous suspension into an accepts portion and a rejects portion, a finishing device for finishing at least some of the accepts portion leaving the at least one sorting device, at least one last sorting device for separating at least some portion of the rejects portion leaving the at least one sorting device into an accepts portion and an rejects portion, and a flotation device for separating at least some portion of the accepts portion leaving the at least one last sorting device into an accepts portion and a rejects portion, wherein at least some portion of the accepts portion leaving the flotation device is subjected to finishing using the finishing device.

The apparatus may further comprise at least one intermediate sorting device arranged between the at least one sorting device and the at least one last sorting device, wherein at least some of the rejects portion leaving the at least one sorting device is separated using the at least one intermediate sorting device into an accepts portion and a rejects portion, and wherein at least some of the accepts portion leaving the at least one intermediate sorting device is subjected to finishing using the finishing device. At least some of the rejects portion leaving the at least one intermediate sorting device may be conveyed to the at least one last sorting device.

The apparatus may further comprise at least one intermediate sorting device arranged between the at least one sorting device and the at least one last sorting device and an additional flotation device, wherein at least some of the rejects portion leaving the at least one sorting device is separated using the at least one intermediate sorting device into an accepts portion and a rejects portion, wherein at least some of the accepts portion leaving the at least one intermediate sorting device is separated using the additional flotation device into an accepts portion and a rejects portion, and wherein at least some of the accepts portion leaving the additional flotation device is subjected to finishing using the finishing device. At least one of the rejects portion leaving the at least one intermediate sorting device may be conveyed to the at least one last sorting device.

The apparatus may further comprise at least a first and a second intermediate sorting device arranged between the at least one sorting device and the at least one last sorting device, wherein at least some of the rejects portion leaving the at least one sorting device is separated using the first intermediate sorting device into an accepts portion and a rejects portion, wherein at least some of the accepts portion leaving the first intermediate sorting device is separated using the second intermediate sorting device into an accepts portion and a rejects portion, and wherein at least some of the accepts portion leaving the second intermediate sorting device is subjected to finishing using the finishing device. At least some of the rejects portion leaving each of the first and second intermediate sorting devices may be conveyed to the at least one last sorting device.

The apparatus may further comprise an additional sorting device arranged after the at least one last sorting device, wherein at least some of the rejects portion leaving the at least one last sorting device is separates using the at least one additional sorting device into an accepts portion and a rejects portion, and wherein at least some of the accepts portion leaving the additional sorting device is conveyed to the at least one last sorting device.

The apparatus may further comprise a first and a second intermediate sorting device arranged between the at least one sorting device and the at least one last sorting device and further comprising an additional sorting device arranged after the at least one last sorting device, wherein at least some of the rejects portion leaving the at least one sorting device is separated using the first intermediate sorting device into an accepts portion and a rejects portion, wherein at least some of the accepts portion leaving the first intermediate sorting device is separated using the second intermediate sorting device into an accepts portion and a rejects portion, wherein at least some of the rejects portion leaving the at least one last sorting device is separated using the additional sorting device into an accepts portion and a rejects portion, and wherein at least some of the accepts portion leaving the second intermediate sorting device is subjected to finishing using the finishing device. At least some of the accepts portion leaving the additional sorting device may be conveyed to the flotation device. At least some of the rejects portion leaving each of the first and second intermediate sorting devices may be conveyed to the at least one last sorting device.

Before the fibrous suspension is conveyed to at least one sorting device, the fibrous suspension may be subjected to at least one of dissolution in a dissolution device and pre-purification in a pre-purification device. Before the fibrous suspension is conveyed to at least one sorting device, the fibrous material suspension may be subjected to each of dissolution and pre-purification.

Ink particles may be removed during pre-purification. The ink particles may be removed by flotation during pre-purification. The flotation device may perform a flotation separation without chemicals. The flotation device may perform a flotation separation without chemicals used to remove inks. The flotation device may perform a flotation separation without flotation chemicals. At least one of the at least one sorting device and the at least one last sorting device may comprise a pressure sorter. The pressure sorter may be equipped with at least one wire. The at least one wire may have openings. The openings may comprise slits having a width of between about 0.08 and 0.5 mm. The openings may comprise holes having a diameter of between about 0.8 and 3 mm. A dry matter content of the fibrous suspension before entering the at least one sorting device may be between about 0.6 and 2.5%. A dry matter content of the fibrous suspension before entering the at least one sorting device may be between about 2 and 4%. The flotation device may comprise a selectively functioning flotation cell. The fibrous material suspension may comprise adhesive particles. The fibrous material suspension may be chemically treated in order to increase a surface activity of interfering materials, the chemical treatment occurring prior to the flotation device. Before the fibrous suspension is conveyed to at least one sorting device, the fibrous suspension may be subjected to dispersion, and wherein a specific work of at least 20 kWh/to is transmitted to the fibrous suspension during the dispersion.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In multistep wet straining, rejects of a sorting step are introduced into a subsequent sorting step. The accepted stock quality differs depending on whether the step is the first, second, or a subsequent step. The content of the interfering materials of the accepted stock generally increases from step to step. A certain amount of interfering materials to be sorted will invariably get into the accepted stock, even if this amount is small. The accepted stock of the last step has the highest comparative percentage of interfering materials because of the increase in the dirt content from step to step, especially with interfering materials that are very fine or are not very dimensionally stable. These interfering materials can easily get into the accepted stock during the wet straining process. In particular instances, the content of the interfering materials can also be the highest in the accepted stock of the sorting device that does not belong to the last step.

The "accepts" quantity decreases from step to step and the percentage of interfering materials increases. Fine interfering materials can be separated out effectively by a flotation process provided that the materials are hydrophobic. These materials include adhesives (also called "stickies"). The present invention economically removes much of this fine interfering material.

The present invention uses a flotation process, which functions selectively, i.e., it leaves the hydrophilic fibers in the accepted stock and concentrates on only the interfering materials in the flotation foam. Selective flotation processes of this kind are widely known in the art and are, therefore, not explained in detail. The suspension is prepared before the actual flotation so that as great as possible a percentage of the interfering materials contained therein can be floated. The preparation of the suspension can be executed either mechanically or chemically. For example chemical means may be used to increase the surface activity of the materials to be floated out, in order to intensify their hydrophobic nature.

Figure 1:
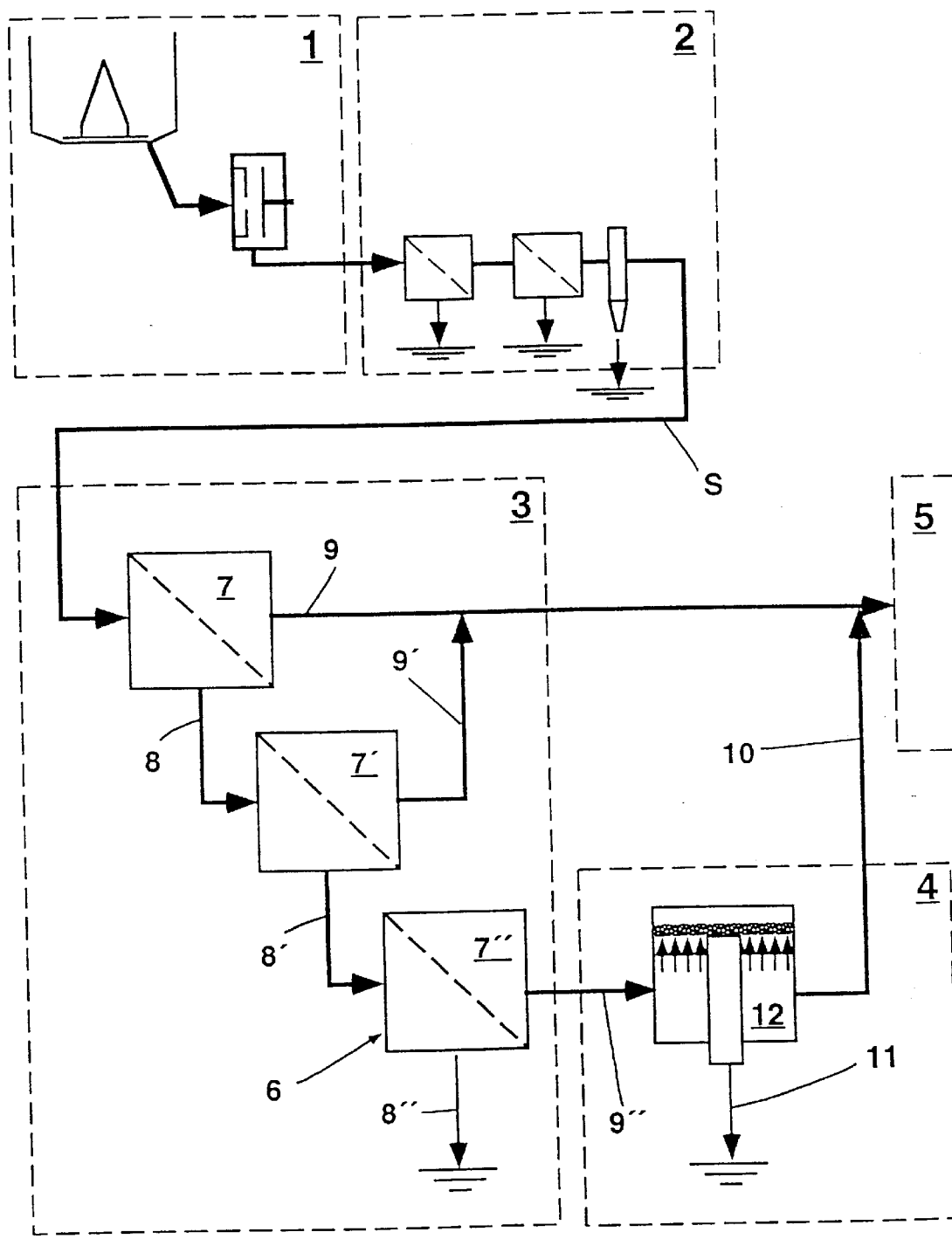
FIG. 1 shows a basic process schematic for carrying out the process according to an embodiment of the present invention.

Referring to the drawings wherein like numerals represent like elements, FIG. 1 shows the division of the process into the individual steps: dissolution 1 (by a dissolution device), pre-purification 2 (by a pre-purification device), wet straining 3 (by a wet straining device), flotation 4 (by a flotation device), and finishing 5 (by a finishing device). In dissolution 1, paper stock to be processed is mixed with water and broken down to the point that a pumpable suspension is produced. This suspension may also be speck-free. Pre-purification 2 is also carried out early in the process, e.g., with the aid of hydrocyclones or junk sorters. Removal of printing inks, known as de-inking, can also be carried out at the pre-purification step 2. The dissolution 1 can also be continuously performed at the de-inking process. The suspension can be deflaked or dispersed and thus prepared for the wet straining process 3. During dispersion, a specific work of at least 20 kWh/to is transmitted to the fibrous suspension. The dissolution 1 and pre-purification 2 processes are usually not separate and discrete, as shown in the Figures, but take place in partial steps and in an alternating manner.

After execution of these dissolution 1 and pre-purification 2 steps, the suspension S travels into the multistep wet straining device 3. In the example shown, the wet straining device 3 includes a respective first sorting device 7, a second sorting device 7' and a third sorting device 7". At least one wire is disposed in each of the sorting devices 7, 7', 7", which divides the incoming suspension S into an "accepts" portion 9, 9', or 9" and a "rejects" portion 8, 8', or 8". Each sorting device 7, 7', 7" performs a respective first, second and last sorting step 6. The sorting devices 7, 7', 7" are connected so that the subsequent step respectively receives the "rejects" portion of the preceding step. In the present invention, the "rejects" portions 8, 8', or 8" may vary in magnitude from each other.

The wet straining process 3 shown in FIG. 1 has three steps. The "accepts" portion 9" of the last step 6 is treated in by a flotation device 4 in a flotation step, for which a flotation cell 12 is used. The fine interfering materials are removed as completely as possible in the "rejects" portion 11, and the purified fibrous suspension travels as an "accepts" portion 10, together with the remaining "accepts" portions 9, 9', into the finishing device 5 of the finishing step.

Figure 2:
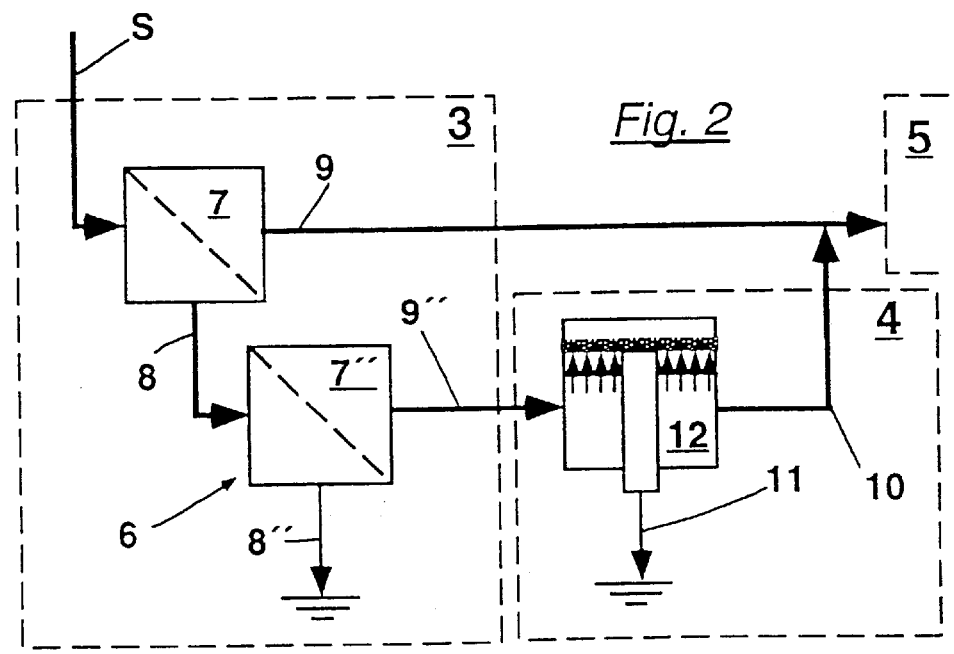
FIG. 2 shows a basic process schematic for carrying out the process according to a second embodiment of the present invention.

While FIG. 1 shows a three step wet straining 3, it is readily appreciable by those skilled in the art that more or fewer than three wet straining steps may be used in alternative embodiments. FIG. 2 shows a two-step wet straining process 3. The number of wet straining steps 3 used in the invention depends on individual specific conditions and requirements, and the needs of the user.

Figure 3:
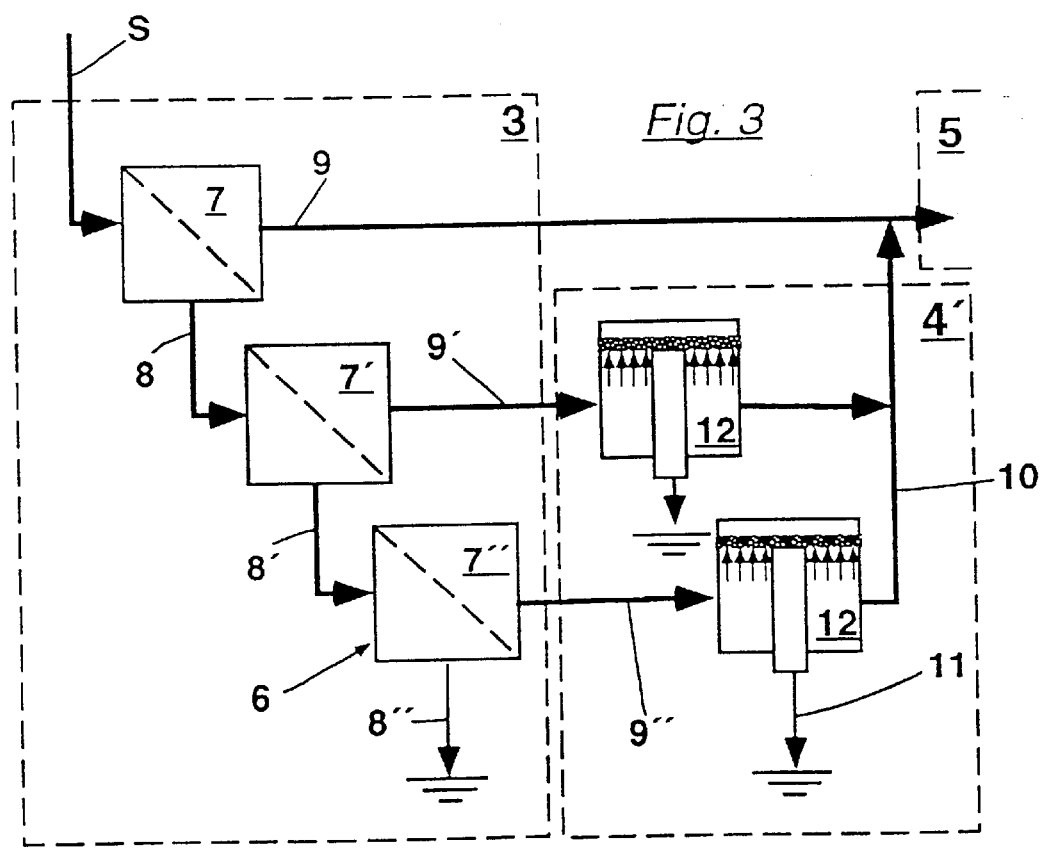
FIG. 3 shows a basic process schematic for carrying out the process according to a third embodiment of the present invention.

As shown in FIG. 3, the sorting device 7' of the wet-straining step 3 may also be combined with a flotation step 4. Thus, the wet straining process 3 can be made more efficient when excessive interfering material quantities are already contained by the sorting device 7' of the wet-straining step 3. In certain instances, a last step 6 is performed at the sorting device 7" (e.g., by means of very fine wire openings) so that few interfering materials get into the "accepts" portion at this step. Additionally, the flotation of the "accepts" portion of the sorting device 7' of the wet-straining step 3 alone may suffice.

The "accepts" portion 9' of the sorting device 7' (i.e., the second step), together with the "accepts" portion 9" of the sorting device 7" (i.e., at the last step 6), could also be introduced into a single flotation cell 12 in alternative embodiments.

Figure 4:
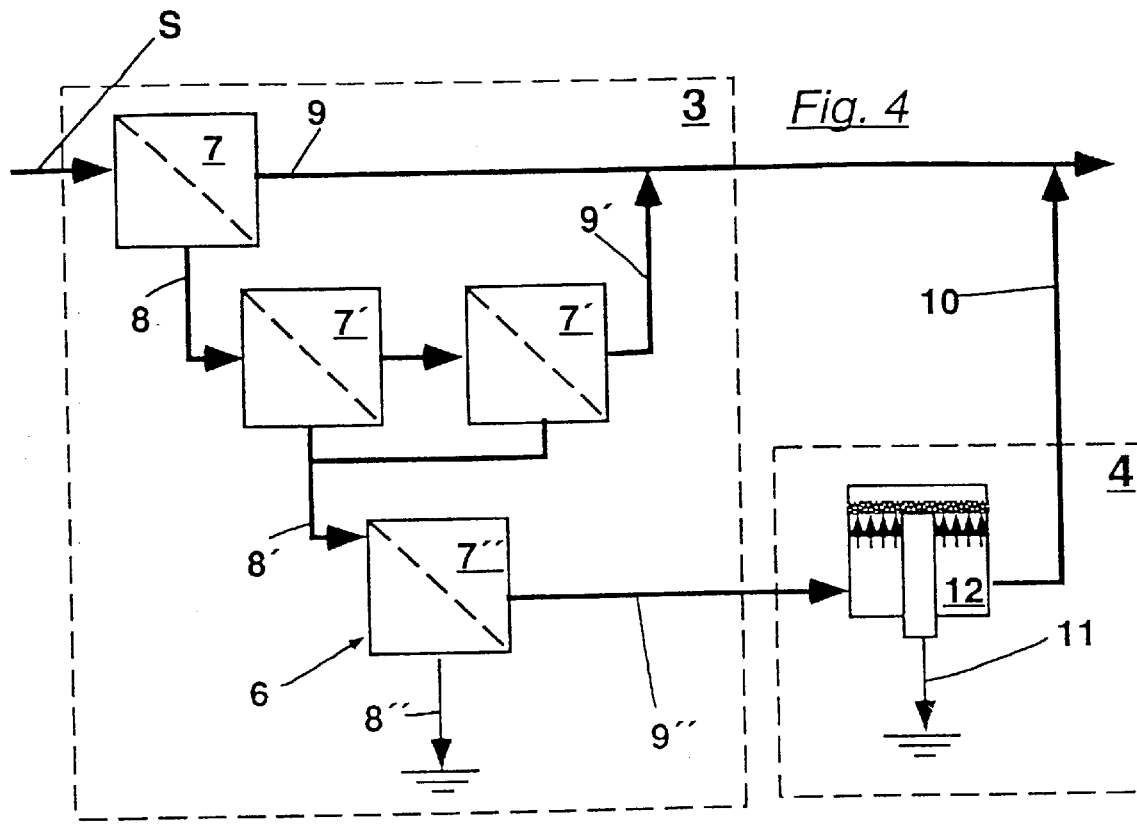
FIG. 4 shows a basic process schematic for carrying out the process according to a fourth embodiment of the present invention.

In the embodiment shown in FIG. 4, the accepted stock of the sorting device 7' (i.e., the second step) is improved. Two sorting devices 7' are connected in series with respect to the accepted stock and the combined "rejects" 8" are supplied into the sorting device 7" of the last step 6. The "accepts" portion 9' of the second step is then combined with the "accepts" portion 9 from the first step.

Figure 5:
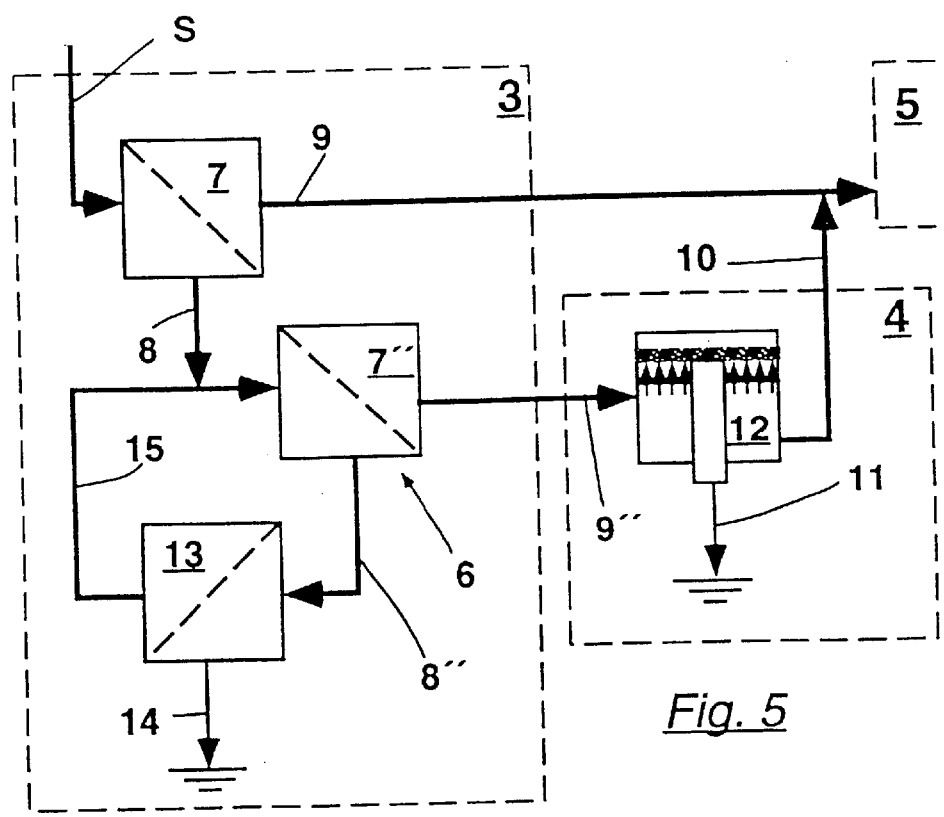
FIG. 5 shows a basic process schematic for carrying out the process according to a fifth embodiment of the present invention.

FIG. 5 shows a variant of multistep wet straining 3. In this variant, the "rejects" 8" from the last step 6 are introduced into an additional sorting device 13. An "accepts" portion 15 of this additional sorting device 13 is returned and travels into the sorting device 7", together with the "rejects" portion 8 of the first step, into the sorting device 7" of the last step 6. The "rejects" portion 14 of the sorting device 13 is conveyed out of the system.

Figure 6:
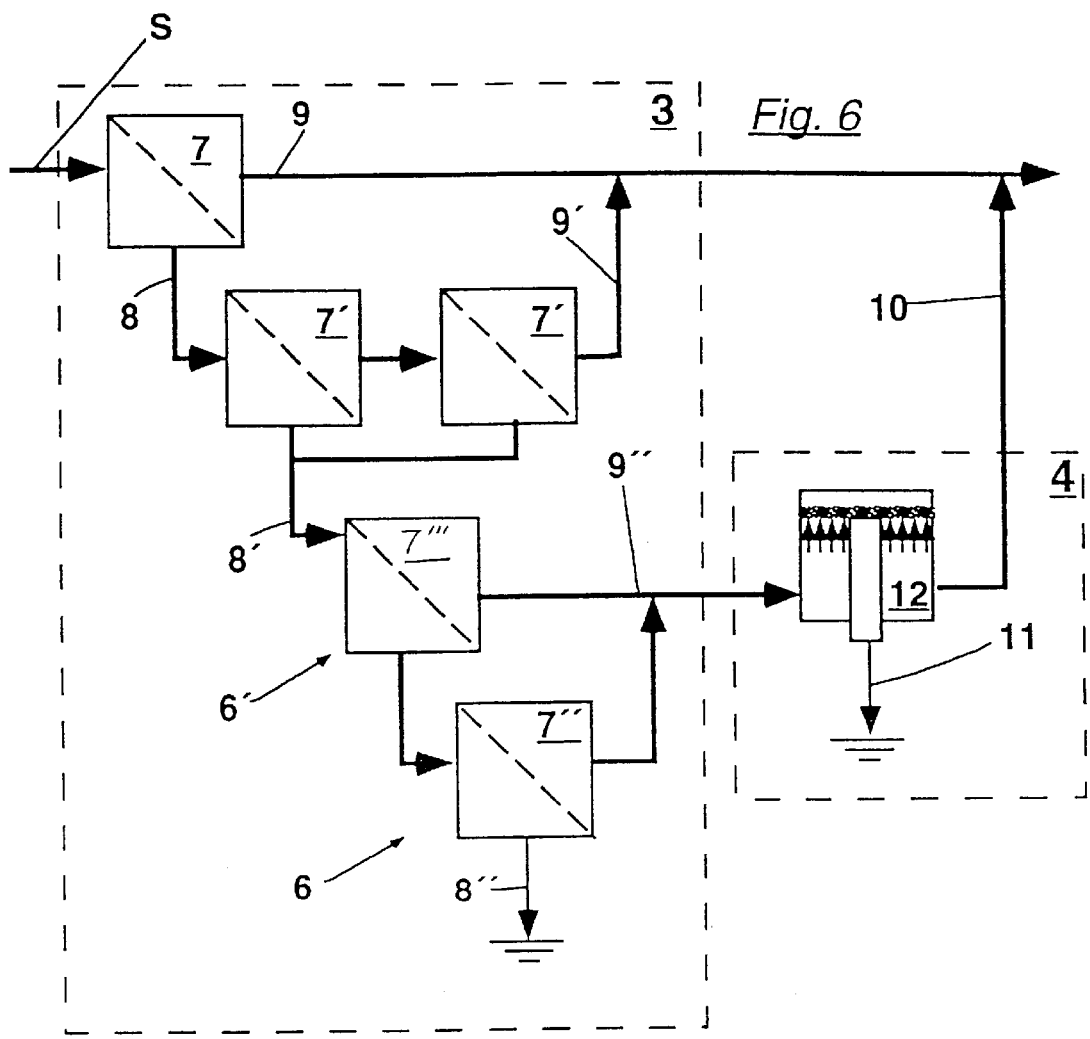
FIG. 6 shows a basic process schematic for carrying out the process according to a sixth embodiment of the present invention.

Referring to FIG. 6, the "accepts" portions 9" of last two steps 6 and 6' are purified in the flotation step 4. Step 6' is performed at an intermediate sorting device 7'''. The embodiment of FIG. 6 is useful in that oftentimes, there are impurities in the "accepts" portion of the second sorting device 7'. There is thus an additional opportunity for the removal of impurities after the suspension leaves the second sorting device 7'. The sorting devices 7' of the second step can be operated at a higher flow rate since the suspension S is further purified further as an "accepts" portion. As a result, the last sorting device 7" is smaller or it can be operated more effectively.

Figure 7:
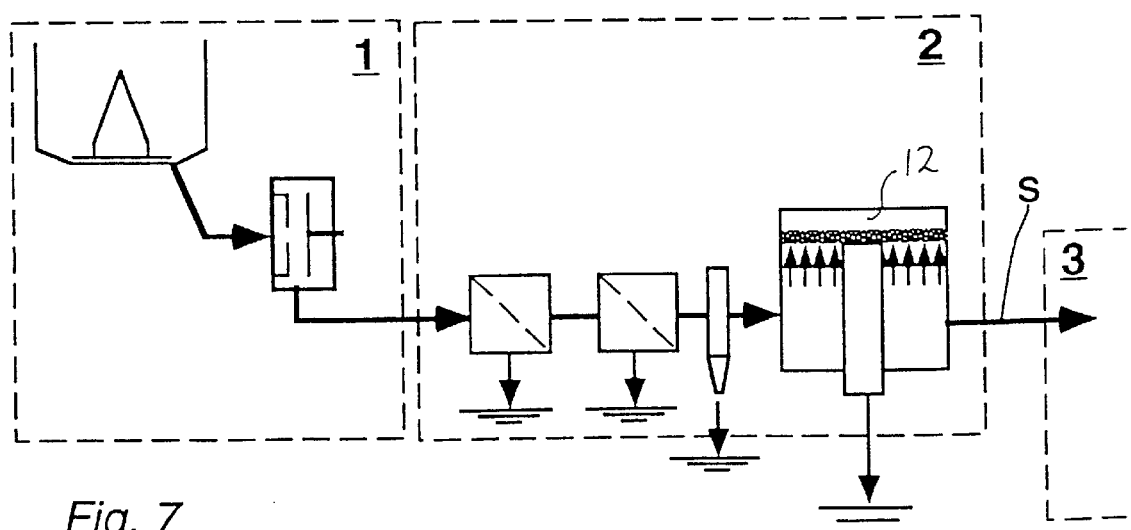
FIG. 7 shows a basic process schematic for carrying out the process according to a seventh embodiment of the present invention.

FIG. 7 shows an additional embodiment of the pre-purification device 2. A majority of ink particles are removed from the fibrous suspension, e.g., by means of flotation. The process according to the invention leads to an improvement in stock quality. The flotation step 4 is particularly effective if it can be exclusively tailored to those interfering materials that can be floated, such as adhesive and hot-melting interfering materials, known as "stickies," which, unlike inks, can often be easily removed and with fewer chemicals. The flotation 4 step is especially useful if inks need not be entirely removed, e.g. raw materials for packaging papers.

The sorting devices 7, 7', 7" are influenced by stock density and the size of the sorting device wire openings. Fibrous suspensions are often sorted in a preparation system, e.g., with stock densities of approximately 2 to 4% and perforated wires of approximately 2 mm. Furthermore, suspensions are also sorted at other locations with slits that have a width of approximately 0.2 mm and stock densities under about 1%. The process according to the invention can be used for both above examples, wherein results often differ. In sorters with slits of approximately 0.2 mm in width, stock densities of around 2 to 3% are still possible. These densities lead to a relatively large mass throughput with a favorable sorting quality and, therefore, lead to optimal and economical operation. However, as problems often arise with adhesive interfering materials ("stickies"), the process according to the invention is particularly useful.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for removing fine impurities from a fibrous suspension, comprising:

conveying the fibrous suspension to at least one sorting device;

separating the fibrous suspension using the at least one sorting device into an accepts portion and a rejects portion;

finishing at least some of the accepts portion leaving the at least one sorting device using a finishing device;

separating at least some portion of the rejects portion leaving the at least one sorting device using at least one last sorting device into an accepts portion and an rejects portion;

separating at least some portion of the accepts portion leaving the at least one last sorting device into an accepts portion and a rejects portion using a flotation device;

removing at least some of the fine impurities from the fibrous suspension; and finishing at least some portion of the accepts portion leaving the flotation device using the finishing device.

2. The process of claim 1, further comprising at least one intermediate sorting device arranged between the at least one sorting device and the at least one last sorting device, wherein the process further comprises:

separating at least some of the rejects portion leaving the at least one sorting device using the at least one intermediate sorting device into an accepts portion and a rejects portion; and finishing at least some of the accepts portion leaving the at least one intermediate sorting device using the finishing device.

3. The process of claim 2, further comprising conveying at least some of the rejects portion leaving the at least one intermediate sorting device to the at least one last sorting device.

4. The process of claim 1, further comprising at least one intermediate sorting device arranged between the at least one sorting device and the at least one last sorting device and an additional flotation device, wherein the process further comprises:

separating at least some of the rejects portion leaving the at least one sorting device using the at least one intermediate sorting device into an accepts portion and a rejects portion;

separating at least some of the accepts portion leaving the at least one intermediate sorting device using the additional flotation device into an accepts portion and a rejects portion; and finishing at least some of the accepts portion leaving the additional flotation device using the finishing device.

5. The process of claim 4, further comprising conveying at least some of the rejects portion leaving the at least one intermediate sorting device to the at least one last sorting device.

6. The process of claim 1, further comprising at least a first and a second intermediate sorting device arranged between the at least one sorting device and the at least one last sorting device, wherein the process further comprises:
   separating at least some of the rejects portion leaving the at least one sorting device using the first intermediate sorting device into an accepts portion and a rejects portion;
   separating at least some of the accepts portion leaving the first intermediate sorting device using the second intermediate sorting device into an accepts portion and a rejects portion; and
   finishing at least some of the accepts portion leaving the second intermediate sorting device using the finishing device.

7. The process of claim 6, further comprising conveying at least some of the rejects portion leaving each of the first and second intermediate sorting devices to the at least one last sorting device.

8. The process of claim 1, further comprising an additional sorting device arranged after the at least one last sorting device, wherein the process further comprises:
   separating at least some of the rejects portion leaving the at least one last sorting device using the at least one additional sorting device into an accepts portion and a rejects portion; and
   conveying at least some of the accepts portion leaving the additional sorting device to the at least one last sorting device.

9. The process of claim 1, further comprising a first and a second intermediate sorting device arranged between the at least one sorting device and the at least one last sorting device and further comprising an additional sorting device arranged after the at least one last sorting device, wherein the process further comprises:
   separating at least some of the rejects portion leaving the at least one sorting device using the first intermediate sorting device into an accepts portion and a rejects portion;
   separating at least some of the accepts portion leaving the first intermediate sorting device using the second intermediate sorting device into an accepts portion and a rejects portion;
   separating at least some of the rejects portion leaving the at least one last sorting device using the additional sorting device into an accepts portion and a rejects portion; and
   finishing at least some of the accepts portion leaving the second intermediate sorting device using the finishing device.

10. The process of claim 9, further comprising conveying at least some of the accepts portion leaving the additional sorting device to the flotation device.

11. The process of claim 10, further comprising conveying at least some of the rejects portion leaving each of the first and second intermediate sorting devices to the at least one last sorting device.

12. The process of claim 1, wherein before the conveying of the fibrous suspension to at least one sorting device, the process comprises subjecting the fibrous suspension to at least one of dissolution and pre-purification.

13. The process of claim 12, wherein before the conveying of the fibrous suspension to at least one sorting device, the process comprises subjecting the fibrous suspension to each of dissolution and pre-purification.

14. The process of claim 12, further comprising removing ink particles during pre-purification.

15. The process of claim 14, wherein the ink particles are removed by flotation during pre-purification.

16. The process of claim 1, wherein the flotation device performs a flotation separation without chemicals.

17. The process of claim 16, wherein the flotation device performs a flotation separation without chemicals used to remove inks.

18. The process of claim 16, wherein the flotation device performs a flotation separation without flotation chemicals.

19. The process of claim 1, wherein at least one of the at least one sorting device and the at least one last sorting device comprises a pressure sorter.

20. The process of claim 19, wherein the pressure sorter is equipped with at least one wire.

21. The process of claim 20, wherein the at least one wire has openings.

22. The process of claim 21, wherein the openings comprise slits having a width of between about 0.08 and 0.5 mm.

23. The process of claim 21, wherein the openings comprise holes having a diameter of between about 0.8 and 3 mm.

24. The process of claim 1, wherein a dry matter content of the fibrous suspension before entering the at least one sorting device is between about 0.6 and 2.5%.

25. The process of claim 1, wherein a dry matter content of the fibrous suspension before entering the at least one sorting device is between about 2 and 4%.

26. The process of claim 1, wherein the flotation device comprises a selectively functioning flotation cell.

27. The process of claim 1, wherein the fibrous material suspension comprises adhesive particles.

28. The process of claim 1, further comprising chemically treating the fibrous material suspension in order to increase a surface activity of interfering materials, the chemical treatment occurring prior to the flotation device.

29. The process of claim 1, wherein before the conveying of the fibrous suspension to at least one sorting device, the process comprises subjecting the fibrous suspension to dispersion, and further comprising transmitting a specific work of at least 20 kWh/to to the fibrous suspension during the dispersion.

30. An apparatus for removing fine impurities from a fibrous suspension, comprising:
   at least one sorting device arranged to receive the fibrous suspension;
   the least one sorting device separating the fibrous suspension into an accepts portion and a rejects portion;
   a finishing device for finishing at least some of the accepts portion leaving the at least one sorting device;
   at least one last sorting device for separating at least some portion of the rejects portion leaving the at least one sorting device into an accepts portion and an rejects portion; and
   a flotation device for separating at least some portion of the accepts portion leaving the at least one last sorting device into an accepts portion and a rejects portion,
   wherein at least some portion of the accepts portion leaving the flotation device is subjected to finishing using the finishing device.

31. The apparatus of claim 30, further comprising at least one intermediate sorting device arranged between the at least one sorting device and the at least one last sorting device, wherein at least some of the rejects portion leaving the at least one sorting device is separated using the at least one intermediate sorting device into an accepts portion and a rejects portion, and wherein at least some of the accepts portion leaving the at least one intermediate sorting device is subjected to finishing using the finishing device.

32. The apparatus of claim 31, wherein at least some of the rejects portion leaving the at least one intermediate sorting device are conveyed to the at least one last sorting device.

33. The apparatus of claim 30, further comprising at least one intermediate sorting device arranged between the at least one sorting device and the at least one last sorting device and an additional flotation device, wherein at least some of the rejects portion leaving the at least one sorting device is separated using the at least one intermediate sorting device into an accepts portion and a rejects portion, wherein at least some of the accepts portion leaving the at least one intermediate sorting device is separated using the additional flotation device into an accepts portion and a rejects portion, and wherein at least some of the accepts portion leaving the additional flotation device is subjected to finishing using the finishing device.

34. The apparatus of claim 33, wherein at least some of the rejects portion leaving the at least one intermediate sorting device are conveyed to the at least one last sorting device.

35. The apparatus of claim 30, further comprising at least a first and a second intermediate sorting device arranged between the at least one sorting device and the at least one last sorting device, wherein at least some of the rejects portion leaving the at least one sorting device is separated using the first intermediate sorting device into an accepts portion and a rejects portion, wherein at least some of the accepts portion leaving the first intermediate sorting device is separated using the second intermediate sorting device into an accepts portion and a rejects portion, and wherein at least some of the accepts portion leaving the second intermediate sorting device is subjected to finishing using the finishing device.

36. The apparatus of claim 35, wherein at least some of the rejects portion leaving each of the first and second intermediate sorting devices is conveyed to the at least one last sorting device.

37. The apparatus of claim 30, further comprising an additional sorting device arranged after the at least one last sorting device, wherein at least some of the rejects portion leaving the at least one last sorting device is separates using the at least one additional sorting device into an accepts portion and a rejects portion, and wherein at least some of the accepts portion leaving the additional sorting device is conveyed to the at least one last sorting device.

38. The apparatus of claim 30, further comprising a first and a second intermediate sorting device arranged between the at least one sorting device and the at least one last sorting device and further comprising an additional sorting device arranged after the at least one last sorting device, wherein at least some of the rejects portion leaving the at least one sorting device is separated using the first intermediate sorting device into an accepts portion and a rejects portion, wherein at least some of the accepts portion leaving the first intermediate sorting device is separated using the second intermediate sorting device into an accepts portion and a rejects portion, wherein at least some of the rejects portion leaving the at least one last sorting device is separated using the additional sorting device into an accepts portion and a rejects portion, and wherein at least some of the accepts portion leaving the second intermediate sorting device is subjected to finishing using the finishing device.

39. The apparatus of claim 38, wherein at least some of the accepts portion leaving the additional sorting device is conveyed to the flotation device.

40. The apparatus of claim 39, wherein at least some of the rejects portion leaving each of the first and second intermediate sorting devices is conveyed to the at least one last sorting device.

41. The apparatus of claim 30, wherein before the fibrous suspension is conveyed to at least one sorting device, the fibrous suspension is subjected to at least one of dissolution in a dissolution device and pre-purification in a pre-purification device.

42. The apparatus of claim 41, wherein before the fibrous suspension is conveyed to at least one sorting device, the fibrous material suspension is subjected to each of dissolution and pre-purification.

43. The apparatus of claim 42, wherein ink particles are removed during pre-purification.

44. The apparatus of claim 43, wherein the ink particles are removed by flotation during pre-purification.

45. The apparatus of claim 30, wherein the flotation device performs a flotation separation without chemicals.

46. The apparatus of claim 45, wherein the flotation device performs a flotation separation without chemicals used to remove inks.

47. The apparatus of claim 45, wherein the flotation device performs a flotation separation without flotation chemicals.

48. The apparatus of claim 30, wherein at least one of the at least one sorting device and the at least one last sorting device comprises a pressure sorter.

49. The apparatus of claim 48, wherein the pressure sorter is equipped with at least one wire.

50. The apparatus of claim 49, wherein the at least one wire has openings.

51. The apparatus of claim 50, wherein the openings comprise slits having a width of between about 0.08 and 0.5 mm.

52. The apparatus of claim 50, wherein the openings comprise holes having a diameter of between about 0.8 and 3 mm.

53. The apparatus of claim 30, wherein a dry matter content of the fibrous suspension before entering the at least one sorting device is between about 0.6 and 2.5%.

54. The apparatus of claim 30, wherein a dry matter content of the fibrous suspension before entering the at least one sorting device is between about 2 and 4%.

55. The apparatus of claim 30, wherein the flotation device comprises a selectively functioning flotation cell.

56. The apparatus of claim 30, wherein the fibrous material suspension comprises adhesive particles.

57. The apparatus of claim 30, wherein the fibrous material suspension is chemically treated in order to increase a surface activity of interfering materials, the chemical treatment occurring prior to the flotation device.

58. The apparatus of claim 30, wherein before the fibrous suspension is conveyed to at least one sorting device, the fibrous suspension is subjected to dispersion, and wherein a specific work of at least 20 kWh/to is transmitted to the fibrous suspension during the dispersion.

* * * * *